United States Patent [19]

Wu

[11] Patent Number: 5,758,749

[45] Date of Patent: Jun. 2, 1998

[54] BRAKE DEVICE FOR AN EXERCISE BICYCLE

[76] Inventor: Mu-Chuan Wu, No. 462-7, Chung Shan Road, Hsi Kang Hsiang, Tainan Hsien, Taiwan

[21] Appl. No.: 826,517

[22] Filed: Apr. 3, 1997

[51] Int. Cl.[6] ................................................ B26L 1/02
[52] U.S. Cl. ................................................... 188/24.12
[58] Field of Search ............................ 188/24.11, 24.12,
188/24.19, 24.21, 24.22, 43.1; 280/288.4;
2482/51, 57, 63, 65

[56] References Cited

U.S. PATENT DOCUMENTS

| | | | |
|---|---|---|---|
| 3,305,048 | 2/1967 | Brilando | 188/24.12 |
| 4,470,483 | 9/1984 | Holtz | 188/24.12 |

FOREIGN PATENT DOCUMENTS

| | | | |
|---|---|---|---|
| 101840 | 9/1965 | Denmark | 188/24.12 |
| 362477 | 8/1938 | Italy | 188/24.12 |
| 662788 | 12/1951 | United Kingdom | 188/24.12 |

Primary Examiner—Chris Schwartz
Attorney, Agent, or Firm—Pro-Techtor International Services

[57] ABSTRACT

A brake device includes a clamping device, a draw bar device disposed on the clamping device, and a lining seat disposed on the clamping device. The draw bar device has a first and a second draw bar. A first frame seat is disposed on a lower portion of the first draw bar. A first compression spring encloses the lower portion of the first draw bar. A second frame seat is disposed on a lower portion of the second draw bar. A second compression spring encloses the lower portion of the second draw bar. The clamping device has a first and a second clamp arm, a support plate, a first and a second leg. The first leg has a first slot hole. The second leg has a second slot hole. The lining seat has a first and a second lining plate. The first lining plate has a first rib, a first and a second block plates. The second lining plate has a second rib, a third and a fourth block plates. The second clamp arm is disposed between the first clamp arm and the support plate. The first frame seat is fastened between the first clamp arm and the support plate. The second frame seat is fastened between the second clamp arm and the support plate. The first and the second block plates are inserted in the first slot hole. The third and the fourth block plates are inserted in the second slot hole.

1 Claim, 7 Drawing Sheets

5,758,749

BRAKE DEVICE FOR AN EXERCISE BICYCLE

BACKGROUND OF THE INVENTION

The present invention relates to a brake device for an exercise bike. More particularly, the present invention relates to a brake device which can stabilize a lining of the brake device.

Referring to FIGS. 1 to 5, an exercise bike has a conventional brake device 1'. The conventional brake device 1' comprises a clamping device 3', a draw bar device 2' disposed on the clamping device 3', and a lining seat 4' disposed on the clamping device 3'. The draw bar device 2' has a first draw bar 22' and a second draw bar 22'. A first frame seat 20' is disposed on a lower portion of the first draw bar 22'. A first compression spring 21' encloses the lower portion of the first draw bar 22' and is confined in the first frame seat 20'. A second frame seat 20' is disposed on a lower portion of the second draw bar 22'. A second compression spring 21' encloses the lower portion of the second draw bar 22' and is confined in the second frame seat 20'. The clamping device 3' has a first clamp arm 300', a second clamp arm 300', a support plate 310', a first leg 30' and a second leg 30'. The first leg 30' has a first slot hole 32'. The second leg 30' has a second slot hole 32'. The lining seat 4' has a first lining plate 40' and a second lining plate 40'. The first lining plate 40' has a first rib 42', a first block plate 41' and a second block plate 41'. The second lining plate 40' has a second rib 42', a third block plate 41' and a fourth block plate 41'. The second clamp arm 300' is disposed between the first clamp arm 300' and the support plate 310'. The first frame seat 20' is fastened between the first clamp arm 300' and the support plate 310'. The second frame seat 20' is fastened between the second clamp arm 300' and the support plate 310'. One of the first block plate 41' and the second block plate 41' is inserted in the first slot hole 32'. One of the third block plate 41' and the fourth block plate 41' is inserted in the second slot hole 32'. Therefore, the first lining plate 40' faces the second lining plate 40'. As shown in FIG. 4, only one of the first block plate 41' and the second block plate 41' is inserted in the first slot hole 32' and only one of the third block plate 41' and the fourth block plate 41' is inserted in the second slot hole 32'.

Therefore, the conventional brake device has the following disadvantages. The block plates are not positioned on the corresponding legs stably. Thus the lining plates are easily disengaged from the corresponding legs.

SUMMARY OF THE INVENTION

An object of the present invention is to provide a brake device which can stabilize a lining of the brake device so that the exercise bike can be stabilized while the brake device is operated.

Accordingly, a brake device comprises a clamping device, a draw bar device disposed on the clamping device, and a lining seat disposed on the clamping device. The draw bar device has a first draw bar and a second draw bar. A first frame seat is disposed on a lower portion of the first draw bar. A first compression spring encloses the lower portion of the first draw bar and is confined in the first frame seat. A second frame seat is disposed on a lower portion of the second draw bar. A second compression spring encloses the lower portion of the second draw bar and is confined in the second frame seat. The clamping device has a first clamp arm, a second clamp arm, a support plate, a first leg and a second leg. The first leg has a first slot hole. The second leg has a second slot hole. The lining seat has a first lining plate and a second lining plate. The first lining plate has a first rib, a first block plate, a second block plate, and a first threaded hole. The second lining plate has a second rib, a third block plate, a fourth block plate, and a second threaded hole. The second clamp arm is disposed between the first clamp arm and the support plate. The first frame seat is fastened between the first clamp arm and the support plate. The second frame seat is fastened between the second clamp arm and the support plate. The first block plate and the second block plate are inserted in the first slot hole. The third block plate and the fourth block plate are inserted in the second slot hole. The first rib has two cambers. The second rib has two cambers. A first bolt passes through a first washer, a first coiled spring, a second washer, and the first threaded hole to fasten the first lining plate. A second bolt passes through a third washer, a second coiled spring, a fourth washer, and the second threaded hole to fasten the second lining plate.

DETAILED DESCRIPTION OF THE INVENTION

Figure 1:
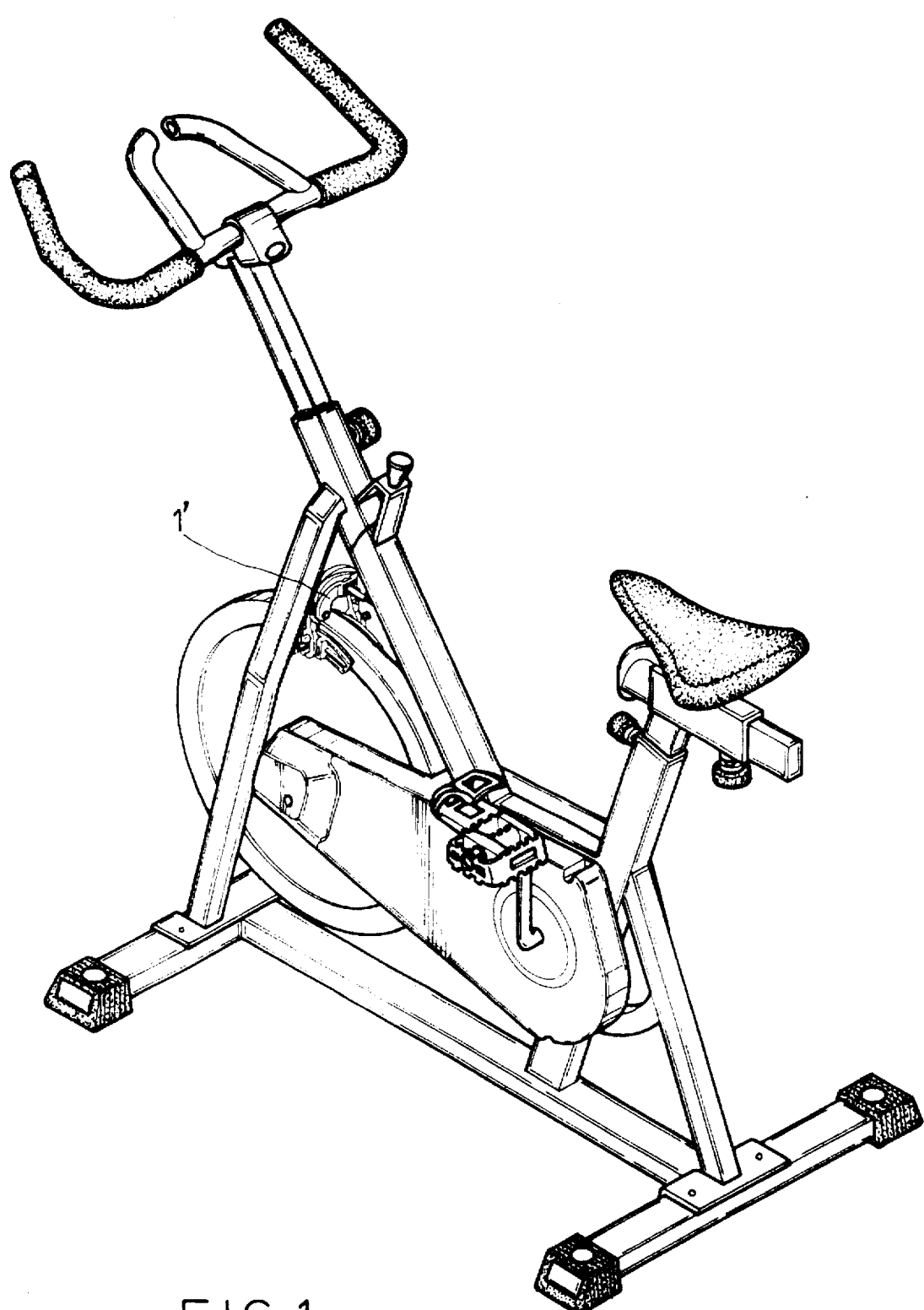
FIG. 1 is a perspective view of an exercise bike of the prior art.
Figure 2:
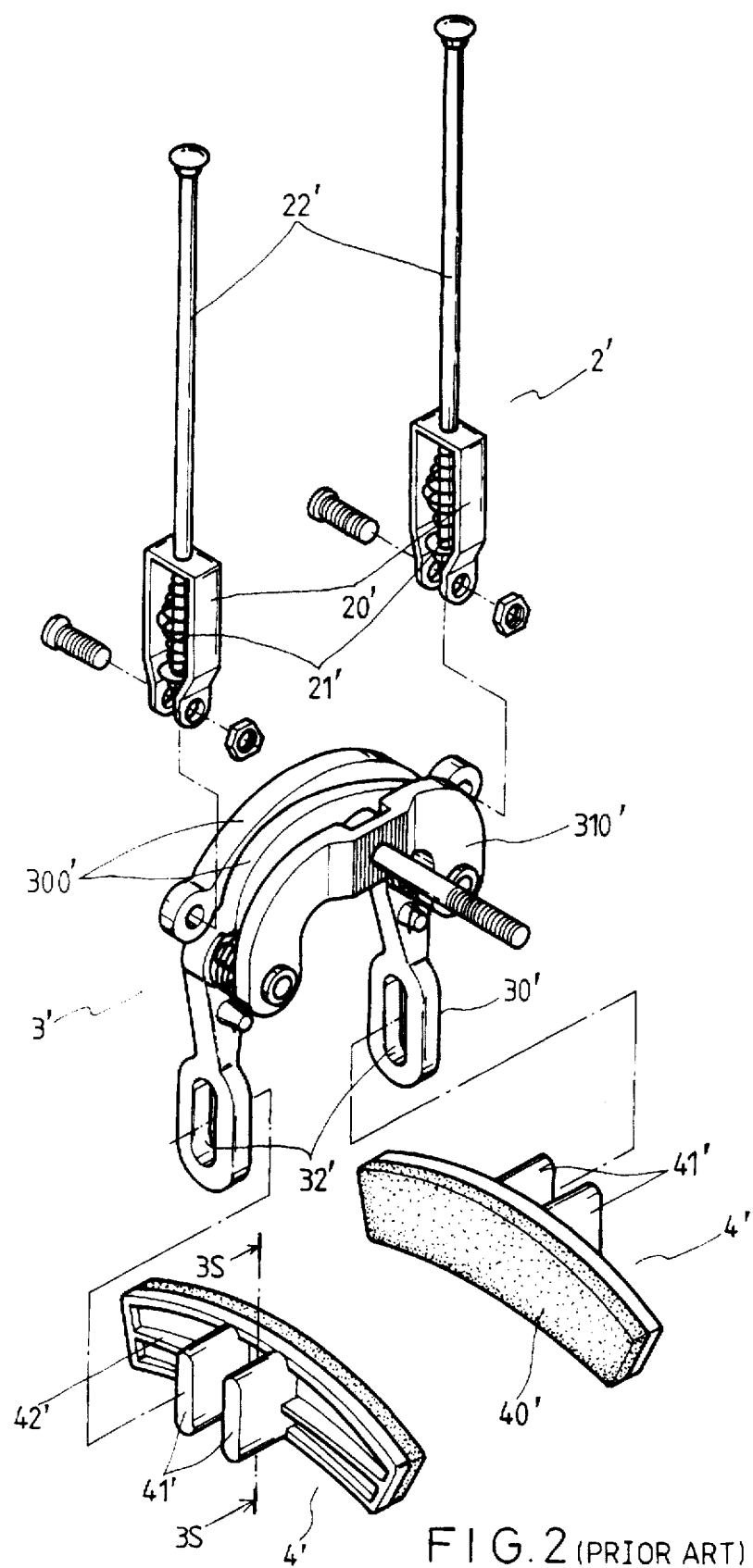
FIG. 2 is a perspective exploded view of a brake device of the prior art.
Figure 3:
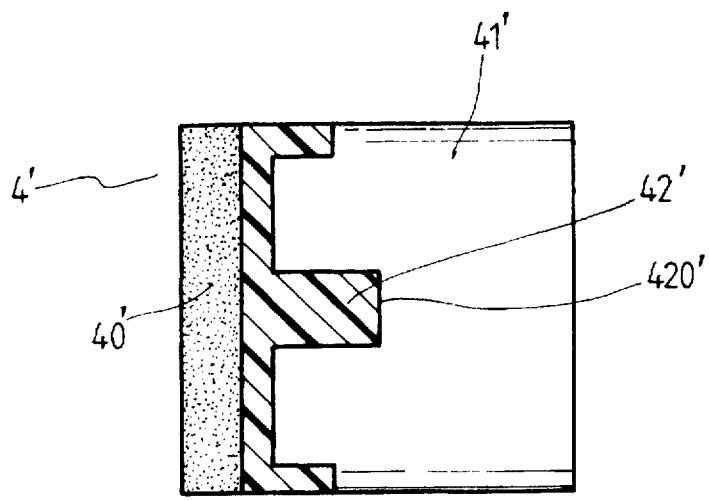
FIG. 3 is a sectional view of a lining plate of the prior art.
Figure 5:
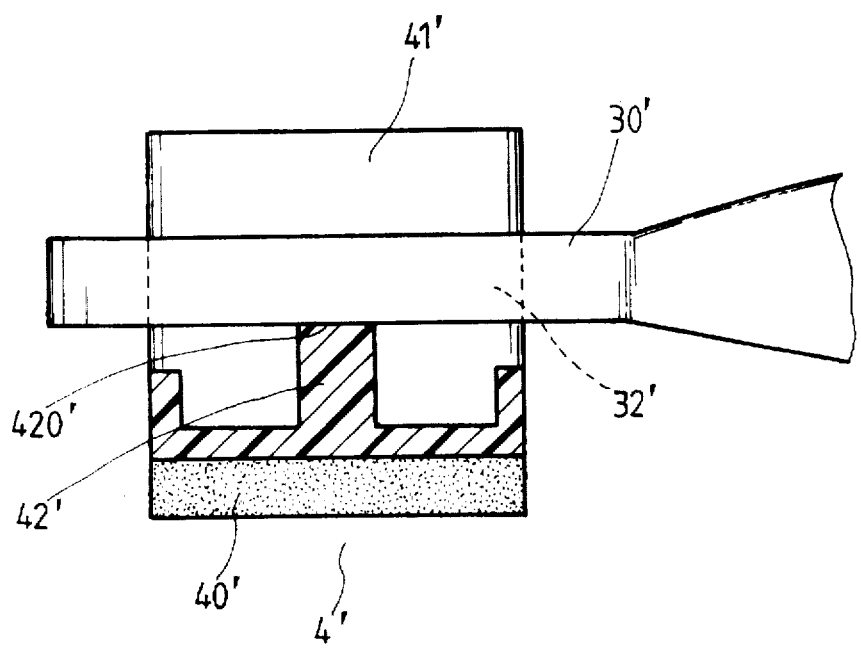
FIG. 5 is another sectional view of a lining plate of the prior art.
Figure 4:
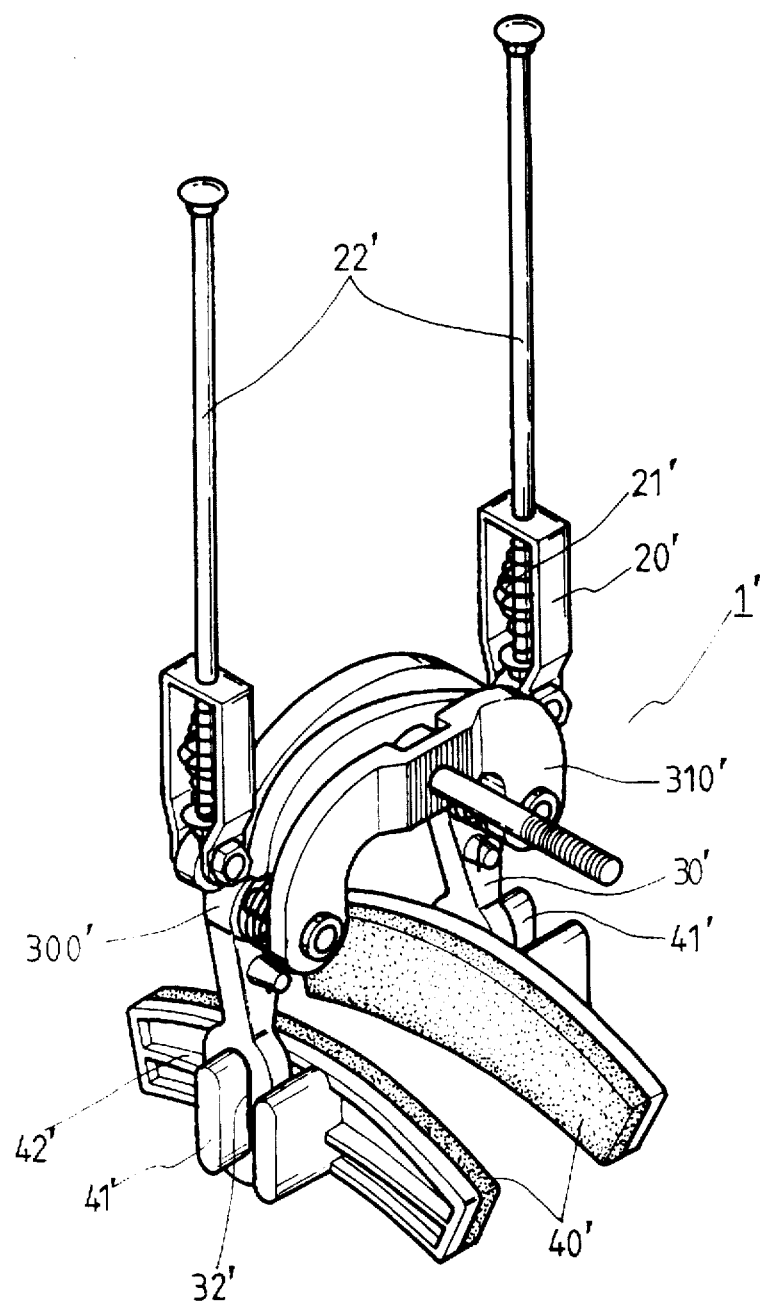
FIG. 4 is a perspective assembly view of a brake device of the prior art.
Figure 6:
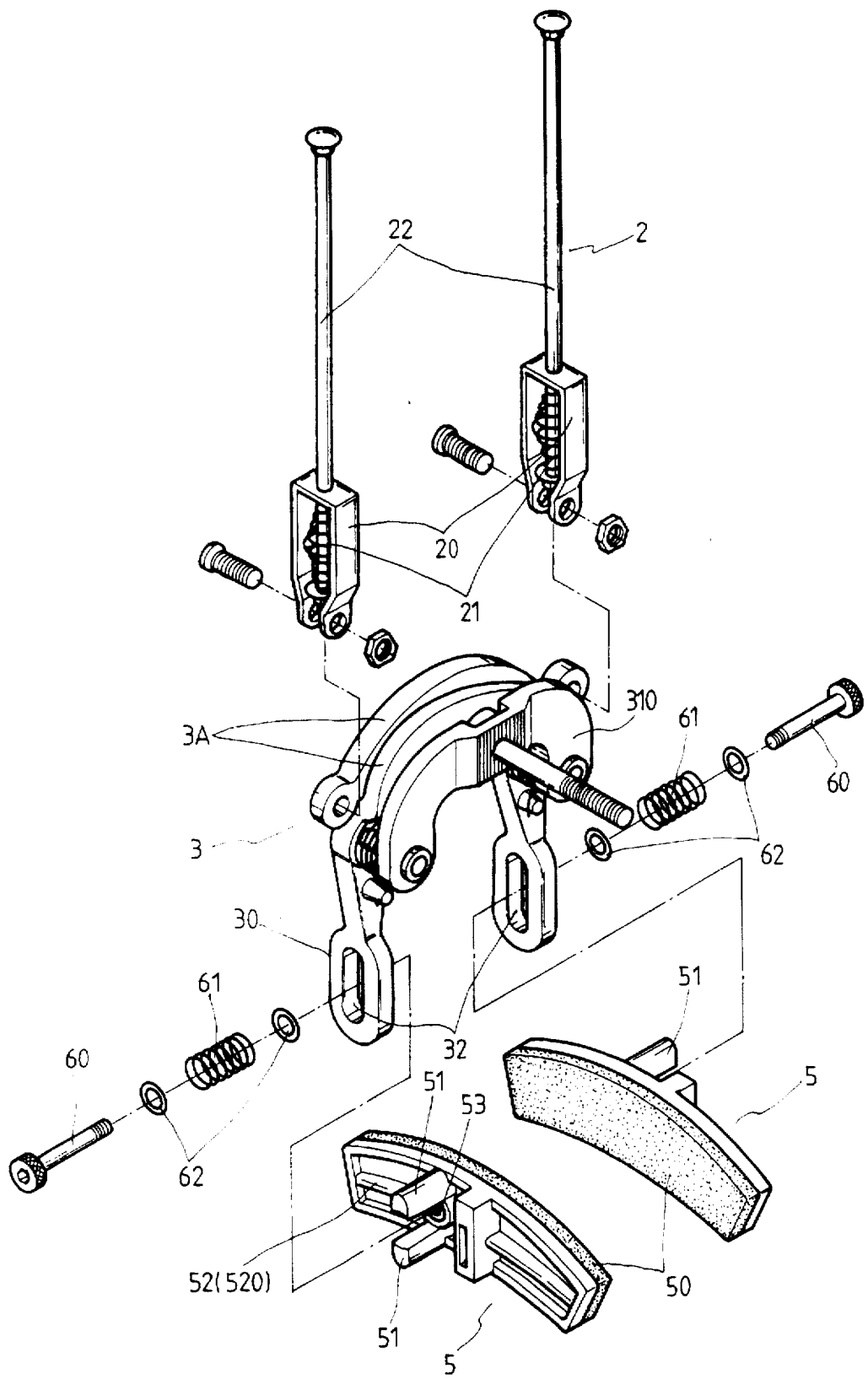
FIG. 6 is a perspective exploded view of a brake device of a preferred embodiment in accordance with the present invention.
Figure 7:
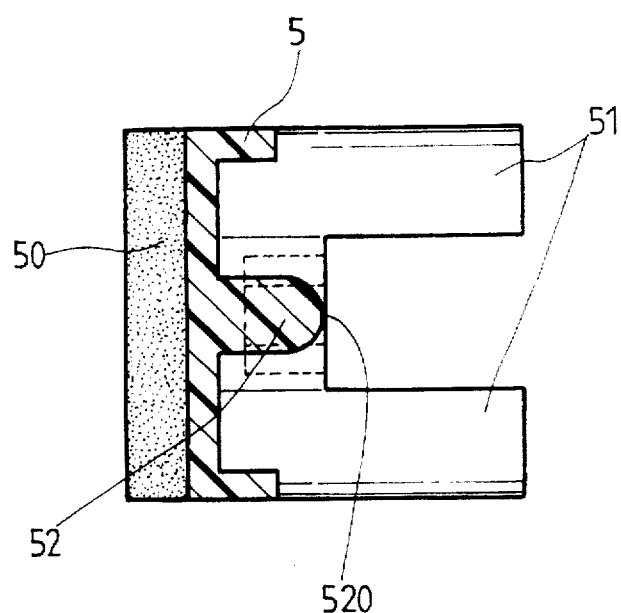
FIG. 7 is a sectional view of a lining seat of a preferred embodiment in accordance with the present invention.
Figure 9:
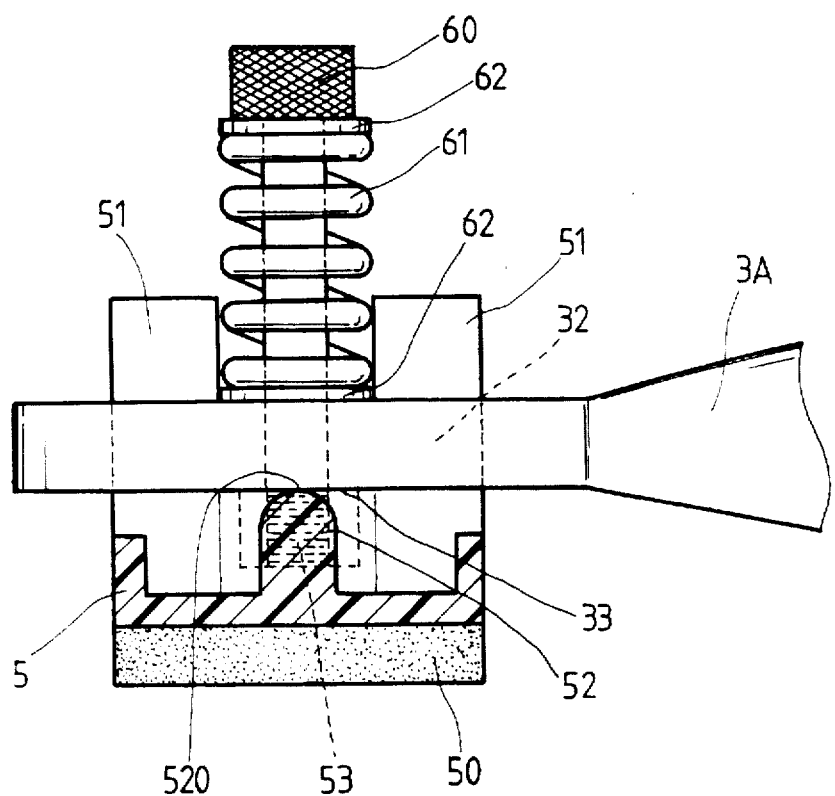
FIG. 9 is a partially sectional view of a brake device of a preferred embodiment in accordance with the present invention.
Figure 8:
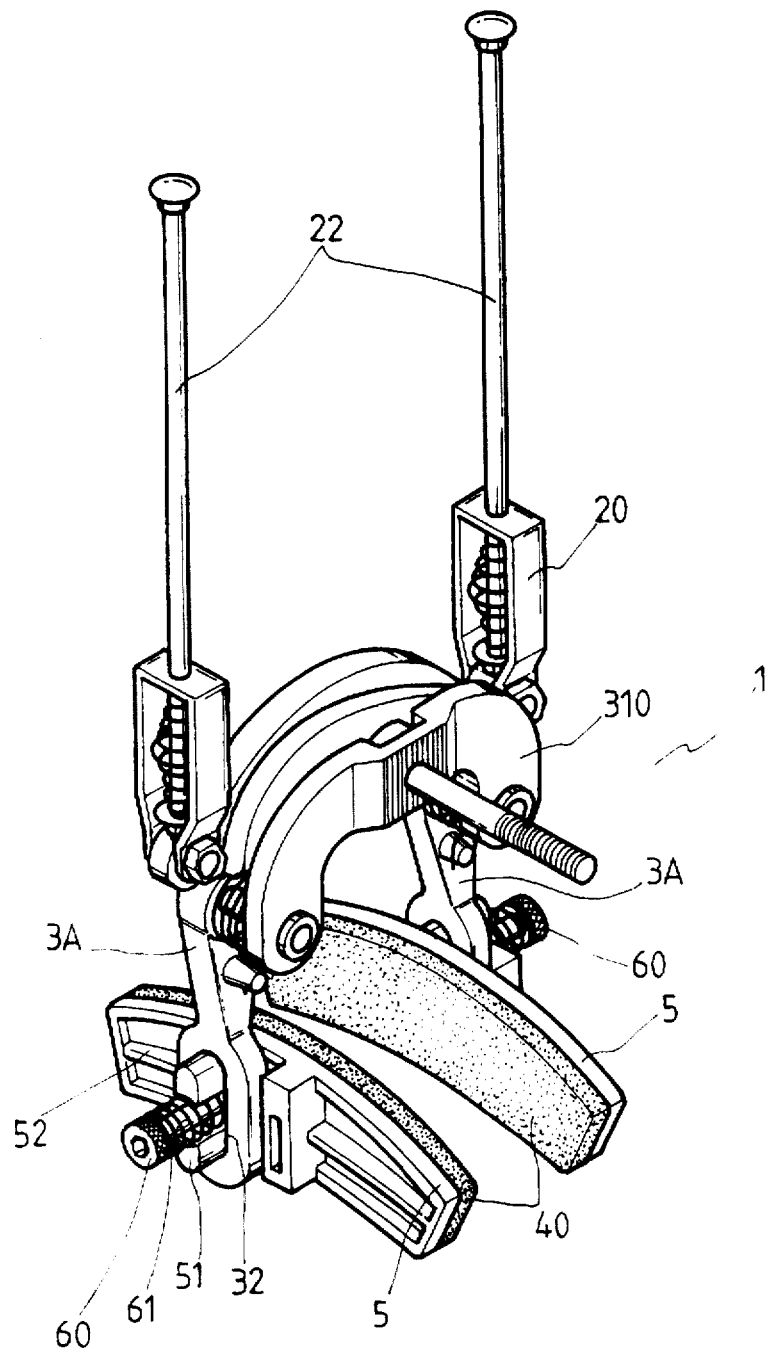
FIG. 8 is a perspective exploded view of a brake device of a preferred embodiment in accordance with the present invention.

Referring to FIGS. 6 to 9, a brake device 1 comprises a clamping device 3, a draw bar device 2 disposed on the clamping device 3, and a lining seat 5 disposed on the clamping device 3. The draw bar device 2 has a first draw bar 22 and a second draw bar 22. A first frame seat 20 is disposed on a lower portion of the first draw bar 22. A first compression spring 21 encloses the lower portion of the first draw bar 22 and is confined in the first frame seat 20. A second frame seat 20 is disposed on a lower portion of the second draw bar 22. A second compression spring 21 encloses the lower portion of the second draw bar 22 and is confined in the second frame seat 20. The clamping device 3 has a first clamp arm 3A, a second clamp arm 3A, a support plate 310, a first leg 30 and a second leg 30. The first leg 30 has a first slot hole 32. The second leg has a second slot hole 32. The lining seat 5 includes two lining plate mounting areas which receive a first lining plate 50 and a second lining plate 50. The first lining plate 50 has a first rib 52, a first block plate 51, a second block plate 51, and a first threaded hole 53. The second lining plate 50 has a second rib 52, a third block plate 51, a fourth block plate 51, and a second threaded hole 53. The second clamp arm 3A is disposed between the first clamp arm 3A and the support plate 310. The first frame seat 20 is fastened between the first clamp arm 3A and the support plate 310. The second frame seat 20 is fastened between the second clamp arm 3A and the support plate 310. The first block plate 51 and the second block plate 51 are inserted in the first slot hole 32. The third block plate 51 and the fourth block plate 51 are inserted in the second slot hole 32. The first rib 52 has two cambers 520. The second rib 52 has two cambers 520.

A first bolt 60 passes through a first washer 62, a first coiled spring 61, a second washer 62, and the first threaded hole 53 to fasten the first lining plate 50. A second bolt 60 passes through a third washer 62, a second coiled spring 61, a fourth washer 62, and the second threaded hole 53 to fasten the second lining plate 50.

The present invention has the following advantages. The block plates are positioned on the corresponding legs stably. The lining plates will not vibrate at all.

The invention is not limited to the above embodiment but various modification thereof may be made. Further, various changes in form and detail may be made without departing from the scope of the invention.

I claim:

1. A brake device comprises:

a clamping device, a draw bar device disposed on the clamping device, and a lining seat including two lining plate mounting areas disposed on the clamping device, the draw bar device having a first draw bar and a second draw bar, a first frame seat disposed on a lower portion of the first draw bar, a first compression spring enclosing the lower portion of the first draw bar and confined in the first frame seat, a second frame seat disposed on a lower portion of the second draw bar, a second compression spring enclosing the lower portion of the second draw bar and confined in the second frame seat, the clamping device having a first clamp arm, a second clamp arm, a support plate, a first leg and a second leg, the first leg having a first slot hole, the second leg having a second slot hole, the lining seat having a first lining plate and a second lining plate, the first lining plate having a first rib, a first block plate, a second block plate, and a first threaded hole, the second lining plate having a second rib, a third block plate, a fourth block plate, and a second threaded hole, the second clamp arm disposed between the first clamp arm and the support plate, the first frame seat fastened between the arm and the support plate, the second frame seat fastened between the second clamp arm and the support plate, the first block plate and the second block plate inserted in the first slot hole, the third block plate and the fourth block plate inserted in the second slot hole, the first rib having two cambers, the second rib having two cambers, a first bolt passing through a first washer, a first coiled spring, a second washer, and the first threaded hole to fasten the first lining plate, and a second bolt passing through a third washer, a second coiled spring, a fourth washer, and the second threaded hole to fasten the second lining plate; such that said coiled springs provide a constant tension urging said lining seat against said arms of said clamping device.

* * * * *